(12) United States Patent
Yang et al.

(10) Patent No.: US 8,221,098 B2
(45) Date of Patent: Jul. 17, 2012

(54) RADIAL TURBOMOLECULAR PUMP WITH ELECTROSTATICALLY LEVITATED ROTOR

(75) Inventors: Wei Yang, Minnetonka, MN (US); Alex Gu, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 575 days.

(21) Appl. No.: 12/425,197

(22) Filed: Apr. 16, 2009

(65) Prior Publication Data

US 2010/0226765 A1 Sep. 9, 2010

Related U.S. Application Data

(60) Provisional application No. 61/158,627, filed on Mar. 9, 2009.

(51) Int. Cl.
*F04B 37/14* (2006.01)
*F04D 19/04* (2006.01)

(52) U.S. Cl. ............... 417/423.4; 417/423.12; 415/89

(58) Field of Classification Search ........... 417/423.4, 417/423.12, 423.13, 363; 415/89
See application file for complete search history.

(56) References Cited

U.S. PATENT DOCUMENTS

| | | | |
|---|---|---|---|
| 6,334,754 B1 | 1/2002 | Kabasawa | 415/90 |
| 6,412,173 B1 | 7/2002 | Johnson et al. | 29/889.23 |
| 6,454,525 B2 | 9/2002 | Blecker et al. | 415/90 |
| 6,461,123 B1 | 10/2002 | Lotz | 417/423.4 |
| 6,604,918 B2 | 8/2003 | Komoriya | 417/423.4 |
| 6,824,357 B2 | 11/2004 | Stanzel | 415/175 |
| 6,910,861 B2 | 6/2005 | Beyer et al. | 415/211.2 |
| 7,278,822 B2 | 10/2007 | Stanzel | 415/199.5 |
| 7,311,491 B2 | 12/2007 | Desbiolles | 415/55.1 |
| 7,404,698 B2 | 7/2008 | Jansen | 415/90 |
| 7,436,093 B2 | 10/2008 | Brunet | 310/90.5 |
| 2002/0098088 A1 | 7/2002 | Stoll | 416/183 |
| 2004/0091351 A1 | 5/2004 | Adamietz et al. | 415/90 |
| 2006/0280595 A1 | 12/2006 | Stoll | 415/90 |
| 2009/0081022 A1 | 3/2009 | Yang | 415/89 |

OTHER PUBLICATIONS

Turbomolecular Pump, http://en.wikipedia.org/wiki/Turbomolecular_pump Turbomolecular Pumping Systems, High Vacuum Pumps. Adixen.

*Primary Examiner* — Joseph L Williams
(74) *Attorney, Agent, or Firm* — Luis M. Ortiz; Kermit D. Lopez

(57) ABSTRACT

A radial turbomolecular pump comprising an electrostatically levitated rotor with a high compression ratio and pump speed at a chip-scale level. The levitated rotor can be sandwiched between a stator plate and a driver and multiple concentric rings of microblades can be fabricated on the rotor plate and the stator plate. The center portions of the driver and the base plate include concentric ring electrodes for rotor levitation by electrostatic forces. The space between two concentric rings of microblades forms a groove that is wide enough to receive the microblades from the opposing disk. The stator disk can be fixed and the rotor disk spins such that the rotor microblades move tangentially relative to the stator microblades. The microblades can be tilted at an angle from the tangent, facilitating momentum transfer to gas molecules in the radial direction.

19 Claims, 4 Drawing Sheets

US 8,221,098 B2

RADIAL TURBOMOLECULAR PUMP WITH ELECTROSTATICALLY LEVITATED ROTOR

CROSS-REFERENCE TO PROVISIONAL APPLICATION

This application claims the benefit of priority based on U.S. Provisional Patent Application Ser. No. 61/158,627 filed Mar. 9, 2009, entitled "Radial Turbomolecular Pump with Electrostatically Levitated Rotor." The above-referenced provisional patent application is hereby incorporated by reference herein in its entirety.

STATEMENT OF GOVERNMENT RIGHTS

The invention disclosed in this application was made with Government support under Contract Number W31P4Q-07-C-0333 awarded by the Defense Advanced Research Projects Agency (DARPA). The Government has certain rights in the invention.

TECHNICAL FIELD

Embodiments are generally related to vacuum pumping systems. Embodiments are also related to microelectromechanical systems (MEMS) and, in particular, to MEMS-based structures, components, and devices. Embodiments are further related to turbomolecular pumps.

BACKGROUND OF THE INVENTION

MEMS components and devices can be integrated with micro systems that combine electrical and mechanical components. MEMS devices can be fabricated utilizing standard integrated circuit batch processing techniques and are capable of being utilized for a variety of applications such as, for example, sensing, controlling, and actuation on a micro scale. MEMS devices can function individually or in the context of, for example, arrays, in order to generate particular effects on a macro scale.

Many MEMS devices require a vacuum environment in order to attain maximum performance and to provide a high vacuum for enhanced performance and reliability. Such a vacuum package also provides protection and an optimal operating environment for the MEMS device. For generating a high vacuum that is free from hydrocarbons, several types of turbomolecular vacuum pumps are known. Through the use of such vacuum pumps pressures in the molecular pressure range (e.g., approximately between 10-6 torr and higher) vacuum levels in macro-scale systems can be achieved. Maintaining such a vacuum at the chip-scale level, however, offers unique challenges due to scaling laws and practical limitations. The large surface-to-volume ratio and relatively large sealing perimeters, out-gassing, permeation, and diffusive leakage, present greater difficulties for chip-scale vacuum pumping applications.

Typical chip-scale MEMS devices that use silicon and metal surfaces can adsorb or entrap volatile molecules from ambient exposure and processing (e.g. plasma, CVD). Therefore, high temperature bake out procedure is needed to remove (out-gas) volatile molecules and residual contaminants, otherwise out-gassing occurs slowly over a long time or even throughout the operating life of the device, acting as a virtual leak. Most prior art MEMS and electronic devices cannot be subjected to a post-processing high temperature bake out (>300° C.) and are unable to form high temperature metallurgical sealing (e.g., welding or brazing). Consequently, both virtual and real leaks are expected to be present throughout their operating life making it difficult to develop viable vacuum packaged MEMS devices.

Based on the foregoing, it is believed that a need exists for an improved chip-scale vacuum pump offering sufficient pump speed to evacuate the volume gas quickly and to counter the out-gassing and leakages from all sources at the targeted low pressure. A need also exists for an improved radial turbomolecular pump with an electrostatically levitated rotor, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved radial turbomolecular pump with an electrostatically levitated rotor.

It is another aspect of the present invention to provide for a viable chip-scale vacuum pump having sufficient pump speed.

The aforementioned aspects and other objectives and advantages can now be achieved as described herein. A radial turbomolecular pump apparatus is disclosed, which includes an electrostatically levitated rotor with a high compression ratio and pump speed at a chip-scale level. The levitated rotor can be sandwiched between a stator plate and a driver and multiple concentric rings of microblades can be fabricated on the rotor plate and the stator plate. The center portions of the driver and the base plate include concentric ring electrodes for rotor levitation by electrostatic forces. The space between two concentric rings of microblades forms a groove that is wide enough to receive the microblades from the opposing disk. The stator and the rotor disks can be assembled face-to-face in proximity and the microblades are inserted into each respective groove with a small clearance. In operation, the stator disk can be fixed and the rotor disk spins. Thus, the rotor microblades can move tangentially relative to the stator microblades. The microblades can be tilted at an angle from the tangent, facilitating momentum transfer to gas molecules in the radial direction.

The rotor disk can be positioned on a spacer utilizing alignment poles. The peripheral area of the driver facing the rotor disk includes multiple planar coils to provide rotating magnetic fields. Every stator and rotor ring forms one pumping stage, thus the pump can be viewed as multi-staged in the radial direction. The turbomolecular pump apparatus based on monolithic microblades can be fabricated utilizing silicon microfabrication on the spinning rotor and the stator substrate. A thick layer of metallic element (e.g., aluminum) can be deposited on the rotor disk facing the coils for induction drive. Optionally, the turbomolecular pump apparatus can be coupled with a flat diaphragm-roughing pump in the initial phase to reduce ambient pressure.

The high-density, microblades facilitate massive multi-stage configuration with high compression ratio and high pump speed against exhaust pressure both in the initial phase and final phase. The chip-scale vacuum pump provides a general-purpose packaging platform to support the vacuum needs of a wide range of micro devices. The attraction forces from the driver and base disk electrodes provide radial stability statically and the vertical and tilt stabilizations can be achieved through dynamic controls. The radial turbomolecular pump apparatus includes necessary gap sensing and actuation electrodes to enable vertical and tilt controls by external digital or analog electronics and to provide sufficient forces to balance pressure difference, gravity, and acceleration.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
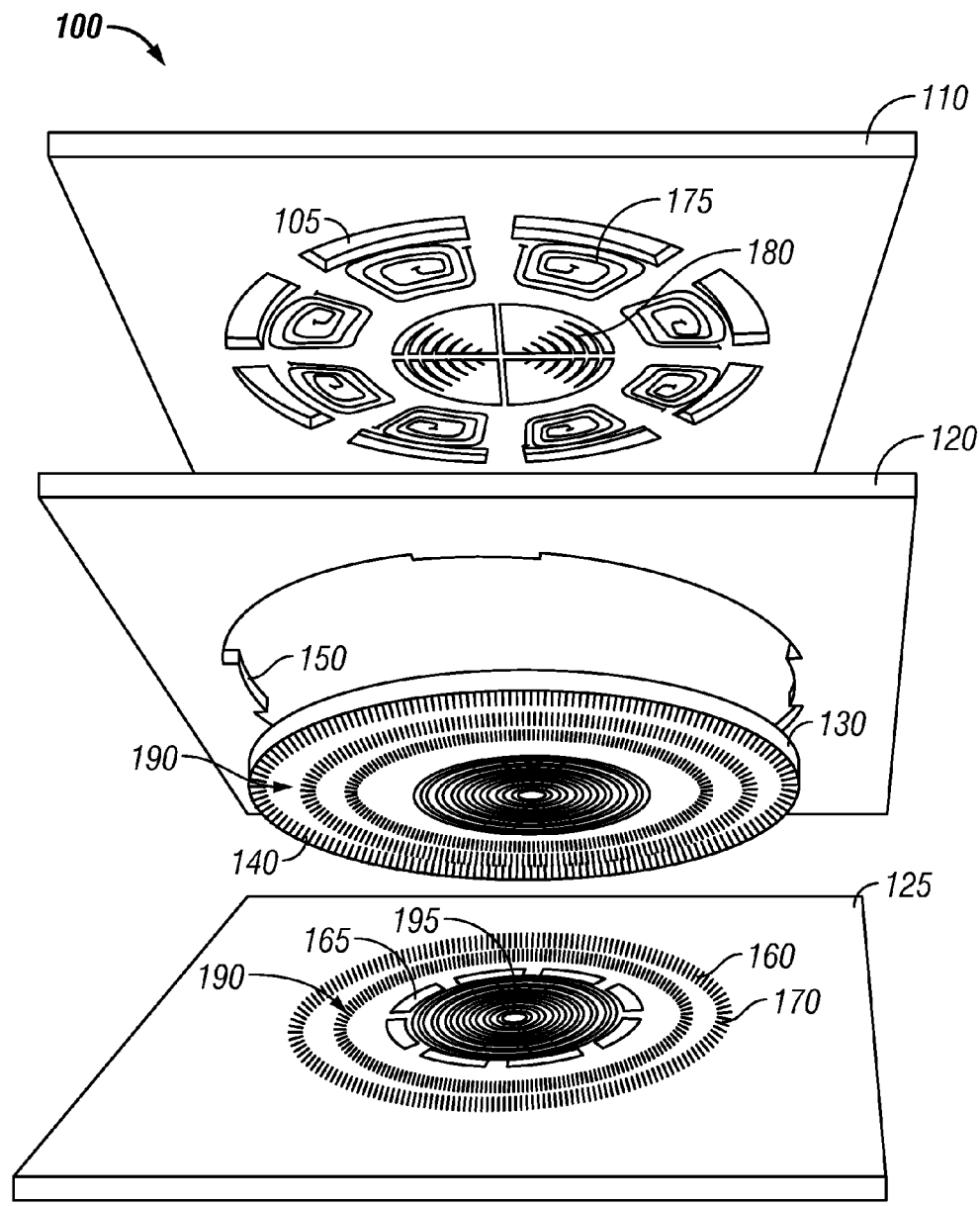
FIG. 1 illustrates an exploded view of a radial turbomolecular pump apparatus, in which embodiments of the present invention may be implemented.

FIG. 1 illustrates an exploded view of a radial turbomolecular pump apparatus 100, in which embodiments of the present invention may be implemented. The turbomolecular pump apparatus 100 is a type of vacuum pump, superficially similar to a turbopump, utilized to obtain and maintain high vacuum. Such vacuum pumps work on the principle that gas molecules can be given momentum in a desired direction by repeated collision with a moving solid surface. The radial turbomolecular pump apparatus 100 generally includes a driver 110, a spacer 120 and a base plate 125. The spacer 120 comprises a rotor disk 130, which can be positioned utilizing alignment poles 150. The rotor disk 130 includes a number of rotor microblades 140 positioned in a substantially radial direction between a stator disk 170 and the driver 110. The stator disk 170 can be located on the base plate 125. The stator disk 170 further includes a number of stator microblades 160 in order to receive the rotor microblades 140. The rotor disk 130 may be preferably configured from, for example, a high strength aluminum alloy.

The rotor microblades 140 can be arranged in concentric rings of blades and tilted towards the radial direction and additionally shaped to increase pumping efficiency. The rotor microblades 140 can be attached to the rotor disk 130 by a variety of attachment means known in the art. The rotor disk 130 and the rotor microblades 140 can be integrally formed from one piece of material. The stator disk 170 is generally positioned in a substantially radial direction and the stator microblades 160 can be arranged in concentric rings of blade tilted towards the radial direction. The alignment poles 150 on the spacer 120 can be utilized to achieve concentricity (e.g., up to 10 μm) during assembling, which prevents crashing of microblades 140 and 160.

Figure 2:
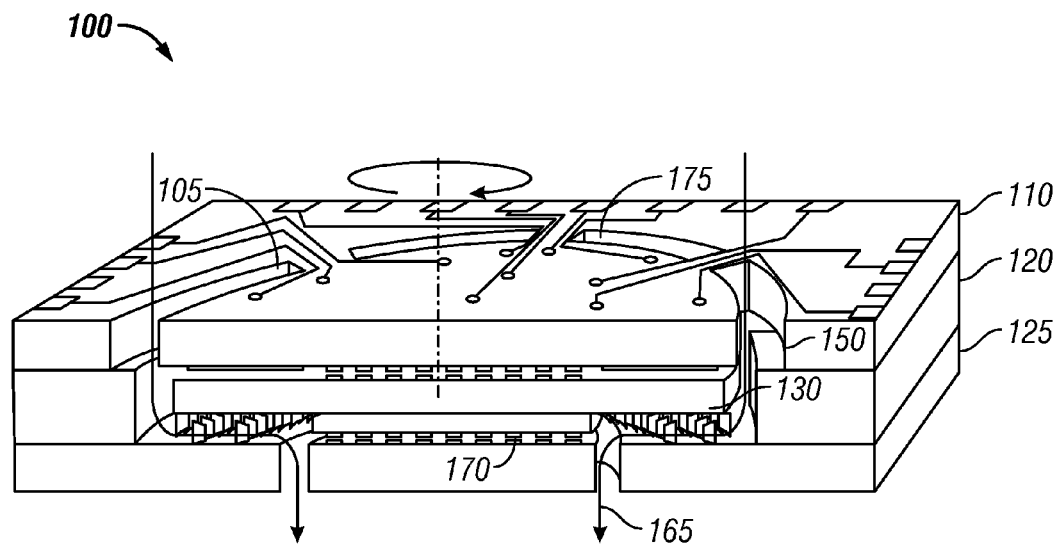
FIG. 2 illustrates a cross-sectional view of the radial turbomolecular pump apparatus depicted in FIG. 1, in accordance with a preferred embodiment.

FIG. 2 illustrates a cross-sectional view of the radial turbomolecular pump apparatus 100 depicted in FIG. 1, in accordance with a preferred embodiment. Note that in FIGS. 1-7, identical or similar blocks are generally indicated by identical reference numerals. The center portions of the driver 110 and the stator disk 170 include concentric ring electrodes 180 and 195 respectively (see FIG. 1 for electrodes 180, 195), for rotor levitation by electrostatic forces. The space between two rings of the rotor disk 130 forms a groove 190 that is just wide enough to receive the stator microblades 160 from the stator disk 170. Similarly, the space between two rings of the stator disk 170 forms the groove 190 that is just wide enough to receive the rotor microblades 140 from the rotor disk 130. The exhaust side 165 of the turbo pump apparatus 100 is also depicted in FIG. 2

The stator disk 170 and the rotor disk 130 can be assembled face-to-face in proximity, and the microblades 140 and 160 can be inserted into each other's grooves 190 with a small clearance. The stator microblades 160 may be integrally formed from one piece of material. The peripheral area of the driver 110 facing the rotor disk 130 contains multiple planar coils 175 to provide rotating magnetic fields. The concentric rings of the stator disk 170 and the rotor disk 130 form a single pumping stage; thus, the turbomolecular pump apparatus 100 can be viewed as multi-staged in the radial direction. The microblades 140 and 160 can be fabricated on the rotor disk 130 and the stator disk 170 in a band such as, for example, 3 mm to 4.5 mm, from the center.

A thick metallic layer (e.g., aluminum) can be deposited on the rotor disk 130 facing the coils 175 for induction drive. The connections to the coils 175 and the electrodes 180 and 195 can be made from the out-facing surfaces through via holes. The rotor disk 130 can maintain, for example, a ~3 μm, gap from the driver 110 and the base plate 125 through dynamic control. The centering force from the concentric electrodes 180 and 195 can further align the rotor disk 130 within, for example, 3 μm, from the center axis. It can be appreciated, of course, that such parameters are merely suggested dimensions and that many other dimensions and sizes are possible.

Figure 3:
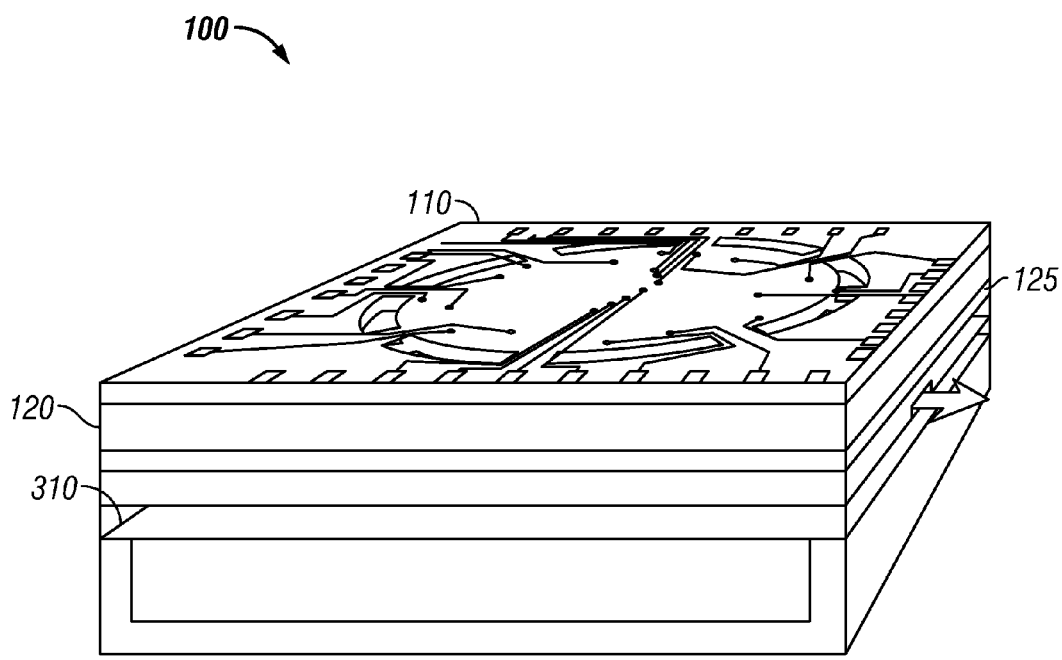
FIG. 3 illustrates a perspective view of the radial turbomolecular pump apparatus depicted in FIGS. 1-2 and associated with a roughing pump, in accordance with a preferred embodiment.

FIG. 3 illustrates a perspective view of the radial turbomolecular pump apparatus 100 associated with a roughing pump 310, which can be implemented in accordance with a preferred embodiment. The radial turbomolecular pump apparatus 100 can be coupled with a flat diaphragm-roughing pump 310 in the initial phase to ultimately achieve an all-turbo, one-pump operation capable of evacuating a 1-mm3 chamber from 760 to $10^{-6}$ τ (torr) within 3 seconds in a low-profile platform of 1×1×0.3 cm3. The roughing pump 310 can be joined to the exhaust side 165 of the turbo pump apparatus 100 in order to reduce the 760 τ ambient pressure to <10 τ to thereby allow the turbo pump apparatus 100 to function in the needed molecular flow regime. These specifications are described for purposes of clarity and specificity; however, they should not be interpreted as constituting limiting features of the disclosed embodiments. Other specifications and parameters are possible. It will be apparent, however, to those of skill in the art that such specifications and parameters can be altered without departing from the scope of the disclosed embodiments.

A motor (not shown) can be coupled to the rotor disk 130 in order to rotate the rotor disk 130. For example, permanent magnets (not shown) can be embedded in the rotor disk 130 and driven by stator coils positioned in the facing surface. Alternatively, magnetic bearings can be used to levitate the rotor disk 130. The motor drives the rotor disk 130 so that each of the rotor microblades 140 passes though a respective one of the stator microblades 160. Compression can be achieved in a direction that is substantially parallel to an axial centerline. Many stages of rotor microblades 140 and stator microblades 160 are required to achieve the necessary compression and pumping speed.

The stator disk 170 can be fixed and the rotor disk 130 spins thus the rotor microblades 140 move tangentially relative to the stator microblades 160. The microblades 140 and 160 can be tilted at an angle from the tangent, facilitating momentum transfer to gas molecules in the radial direction. The gas flow through the inlet 105 moves radially from one concentric ring of microblades 140 and 160, through a corresponding concentric stator ring and then to the next concentric ring of rotor microblades 140 and stator microblades 160.

Figure 4:
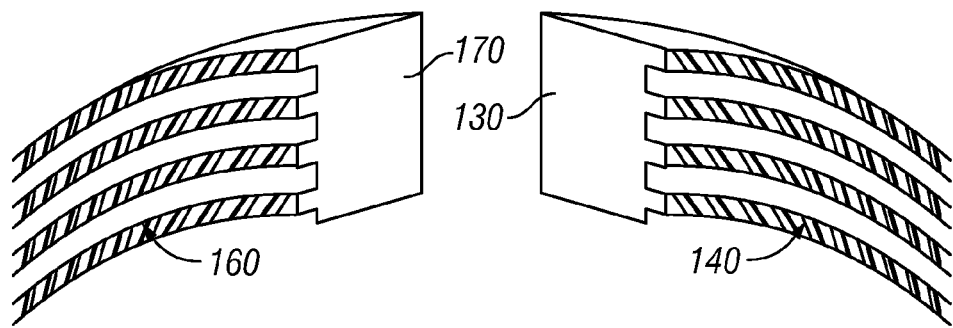
FIG. 4 illustrates a perspective view of microblades in accordance with a preferred embodiment.

FIG. 4 illustrates a perspective view of microblades 140 and 160 in accordance with a preferred embodiment. The rotor microblades 140 and the stator microblade 160 can be shaped and positioned to achieve a certain pumping speed, compression, and efficiency. The pitch of each of the microblades 140 and 160 generally determines the pumping speed and compression. The microblades 140 and 160 can be tilted towards the radial direction for higher pumping speed and the microblades 140 and 160 can be tilted towards the circumferential direction for higher compression, which generally results in lower pumping speed.

Figure 5:
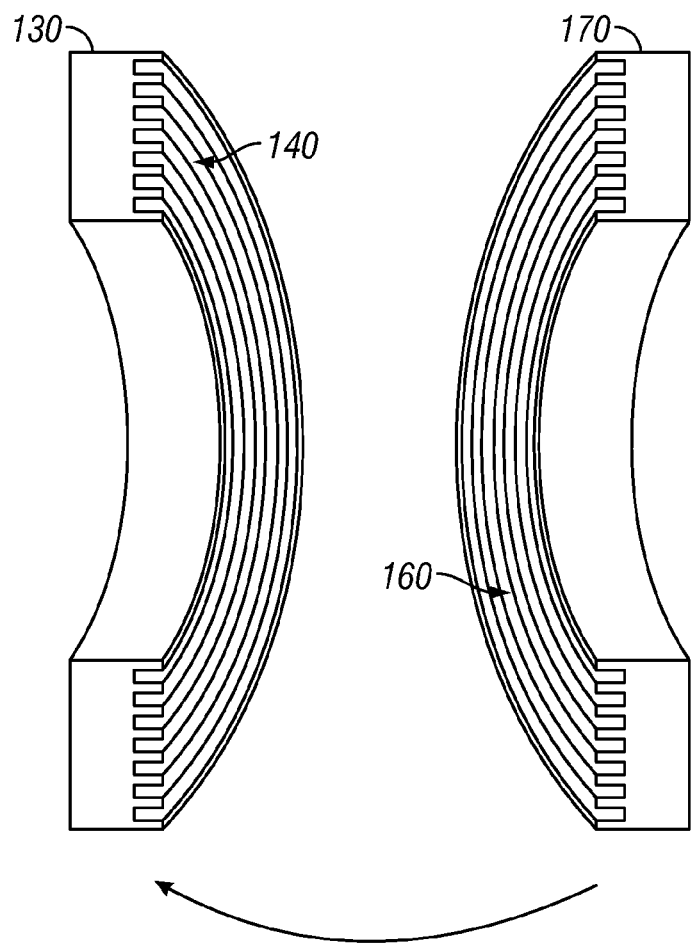
FIG. 5 illustrates a cross-sectional view of a stator disk and a rotor disk, in accordance with a preferred embodiment.
Figure 6:
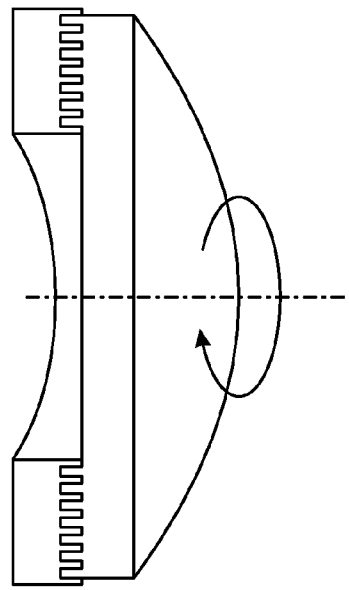
FIG. 6 illustrates an assembled view of the stator disk and the rotor disk, in accordance with a preferred embodiment.

FIG. 5 illustrates a cross-sectional view of the stator disk 170 and the rotor disk 130, in accordance with a preferred embodiment. The microblades 140 and 160 can be tilted at an angle from the tangent, facilitating momentum transfer of gas molecules. Again as reminder, in FIGS. 1-7, identical or similar blocks are generally indicated by identical reference numerals. FIG. 6 illustrates an assembled view of the stator disk 170 and the rotor disk 130, in accordance with a preferred embodiment. The rotor disk 130 and the stator disk 170 respectively can be fabricated with multiple concentric rings of microblades 140 and 160 utilizing silicon fabrication process.

Each stator and rotor microblade ring 140 and 160 forms one pumping stage, thus a multi-staged radial direction can be achieved. The silicon micro fabrication process can be utilized to fit a large number of pumping stages. Thus, even at moderate microblade velocity (e.g. 100 m/s), a small compression ratio per stage can compound over a large number of pumping stages to yield a high compression ratio, which leads to maximum pumping speed. According to Earnshaw's theorem, static electrodes cannot provide stable suspension in all degrees of freedom for a ridged body. However, the attraction forces from the top and base ring electrodes 180 and 195 provide radial stability statically while the vertical (z) and tilt stabilizations can be achieved through dynamic controls.

Figure 7:
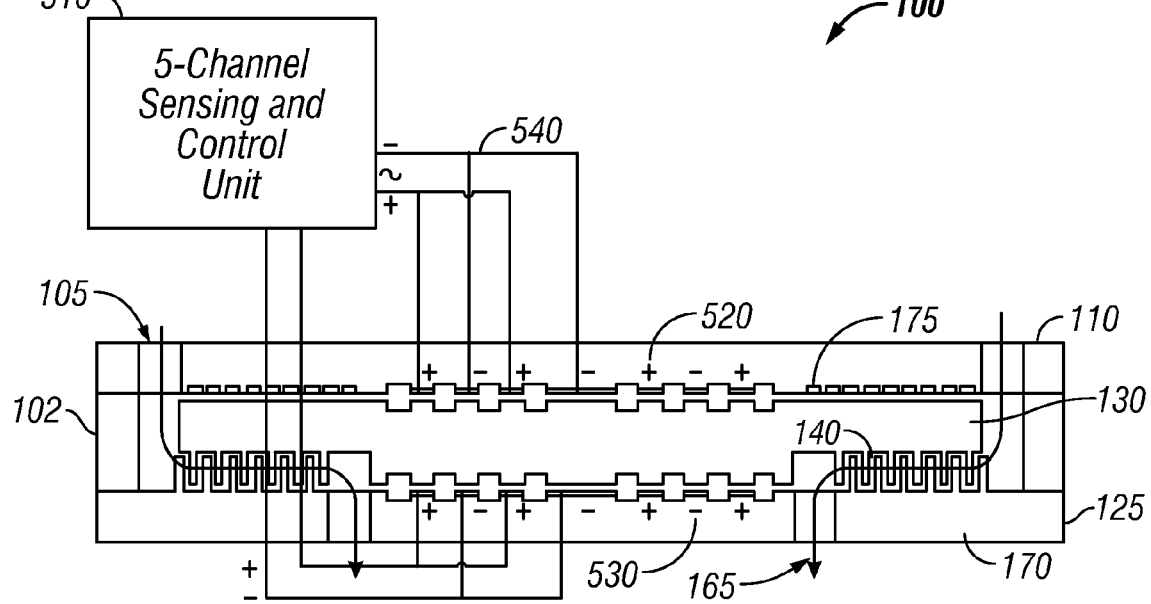
FIG. 7 illustrates a cross-sectional view of a radial turbomolecular pump in the context of an electrostatic levitation scheme, in accordance with an alternative embodiment.

FIG. 7 illustrates a cross-sectional view of the turbomolecular pump apparatus 100 implemented in the context of an electrostatic levitation scheme, in accordance with an exemplary embodiment. The turbomolecular pump apparatus 100 includes concentric ring electrodes such as quad levitation electrodes 520 and base levitation electrodes 530 to provide radial stability statically. The quad electrostatic levitation electrodes 520 can be split into four equal segments on a circular insulating substrate such as the driver 110 with separation bands therebetween. The base levitation electrodes 530 can be formed on the base plate 125. The attraction forces from the top and base levitation electrodes 520 and 530 provide radial stability statically while the vertical (z) and tilt stabilizations can be achieved through dynamic control.

The electrodes 520 and 530 can be utilized to enable vertical and tilt controls by external digital or analog electronics such as, for example, a five-channel sensing and control unit 510, and provides sufficient forces to balance pressure difference, gravity, and acceleration. Such concentric ring electrodes 520 and 530 maximize lateral stability and provide a self-centering alignment within, for example, 3-μm, precision. A positive voltage and a negative voltage can be alternately applied to these electrodes 520 and 530 through lead wires 540 connected to the five-channel sensing and control unit 510 respectively. The five-channel sensing and control unit 510 can be utilized to convert AC probe into equivalent DC bias. Accordingly, the maximum attraction force and levitation rigidity can be increased without damage to electrodes 520 and 530 at lead portions and thus, it possible to convey a levitated body with accuracy. As a reminder, detailed embodiments of the present invention are disclosed herein; however, it is to be understood that the disclosed embodiments are merely exemplary of the invention that may be embodied in various and alternative forms.

The rapidly spinning rotor disk 130 hits gas molecules from the inlet 105 of the turbomolecular pump apparatus 100 towards the exhaust 165 in order to create or maintain a vacuum. The turbomolecular pump apparatus 100 employ multiple stages consisting of the rotor and stator disk 130 and 170 mounted in series. The gas captured by the upper stages is pushed into the lower stages and successively compressed to the level of the fore-vacuum pressure. As the gas molecules enter through the inlet 105, the rotor disk 130, which has a number of angled microblades 140 and 160, hits the molecules.

Thus, the mechanical energy of the microblades 140 and 160 is transferred to the gas molecules. With this newly acquired momentum, the gas molecules enter into the gas transfer holes in the stator disk 170. This leads to the next stage where they again collide with the rotor disk 130. This process can be continued, finally leading outward through the exhaust 165. Because of the relative motion of the rotor disk 130 and the stator disk 170, molecules preferably hit the lower side of the microblades 140 and 160. Because the blade surface looks down, most of the scattered molecules will leave it downwards. The surface is rough, so no reflection can occur. The microblades 140 and 160 needs to be thick and stable for high-pressure operation and as thin as possible and slightly bent for maximum compression.

The experimental results for the turbomolecular pump apparatus 100 support the pumping performance and fabrication feasibility. The electrostatic levitation of the rotor disk 130 and an induction drive via rotating magnetic fields can be provided by phased planar coils 175. For example, the performance of the turbomolecular pump apparatus 100 utilizing Monte Carlo simulation for 160 stages at 300 m/s, or approximately 640 kRPM for a disk diameter of 9 mm, and a pump speed greater than 100 cc/s for 100 μm microblades height project an increased compression ratio greater than 108. The pumping speed of the turbomolecular pump apparatus 100 can be sufficient to hold $10^{-6}$ τ vacuum against a leak rate of approximately $8 \times 10^{-6}$ sccm, which is compatible even with epoxy bonding or low-cost plastic packaging.

The pumping speed by the turbomolecular pump apparatus 100 is unattainable by any other chip-scale pump-cascade with large-scale interconnects that are known in the art, due to conductance limitations. The high-density, microblades 140 and 160 facilitate massive multi-stage configuration with high compression ratio and high pump speed against exhaust pressure of up to, for example, 10 τ in the initial phase and against, for example, 760 τ, in the final phase. The compression ratio per stage can range from, for example, 1.5 to 10, depending on the tangential speed of the microblades 140 and 160. The highest compression ratio and pump speed can be achieved with one moving part and the self-centering alignment can be <3-μm precision by concentric electrostatic electrodes.

The low risk diaphragm-roughing pump 310 can be utilized optionally, which provides 10 τ starting pressure. The optimization and size reduction of the rotor and stator microblades 140 and 160 can ultimately lead to an all-turbo, one-pump solution covering, for example, $10^{-6}$ to 760 torr, thus eliminating the need for a separate roughing pump. These dimensions are described for purposes of clarity and specificity; however, they should not be interpreted in any limiting way. The radially staged MEMS turbomolecular pump apparatus 100 disclosed herein possesses the highest pumping speed achievable at the chip-scale due to the inherent high-flow capacity of turbomachinery. The viable chip-scale vacuum pump apparatus 100 possesses sufficient pump speed to evacuate the volume gas quickly and to counter the outgassing and leakages from all sources at the targeted low pressure.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A radial turbomolecular pump apparatus, comprising:
   a stator disk positioned in a substantially radial direction, said stator disk comprising a plurality of stator microblades extending from said stator disk, said plurality of stator microblades arranged in concentric rings of blades and tilted towards said substantially radial direction;
   a rotor disk positioned between a driver and said stator disk in said substantially radial direction, said rotor disk comprising a plurality of rotor microblades, said plurality of rotor microblades arranged in concentric rings of blades and disposed between said concentric rings of said plurality of stator microblades and tilted towards said substantially radial direction; and
   at least one electrode arranged in concentric rings on a center portion of said driver and said stator disk, wherein a rotation of said rotor disk moves said plurality of rotor microblades tangentially relative to said plurality of stator microblades in order to facilitate a momentum transfer to gas molecules in a radial direction, thereby enabling a high compression ratio and pump speed at a chip-scale level.

2. The apparatus of claim 1 wherein said at least one electrode comprises a levitation electrode.

3. The apparatus of claim 1 further comprising a groove section formed between said concentric rings of blades associated with said rotor disk and said stator disk.

4. The apparatus of claim 3 wherein said groove section is dimensioned to receive and to retain at least one blade among said plurality of stator microblades.

5. The apparatus of claim 1 further comprising at least one planar coil located on a peripheral area of said driver facing said rotor disk to provide rotating magnetic fields.

6. The apparatus of claim 1 further comprising a thick metallic layer deposited on said rotor disk facing said plurality of planar coils for induction drive.

7. The apparatus of claim 2 wherein said at least one levitation electrode generates rotor levitation by electrostatic forces and provides radial stability statically.

8. The apparatus of claim 1 wherein said plurality of stator microblades and said plurality of rotor microblades are configured via a silicon fabrication process.

9. The apparatus of claim 1 wherein said plurality of microblades is tilted at an angle from a tangent facilitating momentum transfer to gas molecules in said radial direction.

10. A radial turbomolecular pump apparatus, comprising:
    a stator disk positioned in a substantially radial direction, said stator disk comprising a plurality of stator microblades extending from said stator disk, said plurality of stator microblades arranged in concentric rings of blades and tilted towards said substantially radial direction;
    a rotor disk positioned between a driver and said stator disk in said substantially radial direction, said rotor disk comprising a plurality of rotor microblades, said plurality of rotor microblades arranged in concentric rings of blades and disposed between said concentric rings of said plurality of stator microblades and tilted towards said substantially radial direction;
    a groove section formed between said concentric rings of blades associated with said rotor disk and said stator disk; and
    at least one electrode arranged in concentric rings on a center portion of said driver and said stator disk, wherein a rotation of said rotor disk moves said plurality of rotor microblades tangentially relative to said plurality of stator microblades in order to facilitate a momentum transfer to gas molecules in a radial direction, thereby enabling a high compression ratio and pump speed at a chip-scale level.

11. The apparatus of claim 10 wherein said at least one electrode comprises a levitation electrode.

12. The apparatus of claim 10 wherein said groove section is dimensioned to receive and to retain at least one blade among said plurality of stator microblades.

13. The apparatus of claim 10 further comprising at least one planar coil located on a peripheral area of said driver facing said rotor disk to provide rotating magnetic fields.

14. The apparatus of claim 10 further comprising a thick metallic layer deposited on said rotor disk facing said plurality of planar coils for induction drive.

15. The apparatus of claim 11 wherein said at least one levitation electrode generates rotor levitation by electrostatic forces and provides radial stability statically.

16. The apparatus of claim 10 wherein said plurality of stator microblades and said plurality of rotor microblades are configured via a silicon fabrication process.

17. The apparatus of claim 10 wherein said plurality of microblades is tilted at an angle from a tangent facilitating momentum transfer to gas molecules in said radial direction.

18. A radial turbomolecular pump apparatus, comprising:
    a stator disk positioned in a substantially radial direction, said stator disk comprising a plurality of stator microblades extending from said stator disk, said plurality of stator microblades arranged in concentric rings of blades and tilted towards said substantially radial direction;
    a rotor disk positioned between a driver and said stator disk in said substantially radial direction, said rotor disk comprising a plurality of rotor microblades, said plurality of rotor microblades arranged in concentric rings of blades and disposed between said concentric rings of said plurality of stator microblades and tilted towards said substantially radial direction; and at least one electrode arranged in concentric rings on a center portion of said driver and said stator disk, wherein a rotation of said rotor disk moves said plurality of rotor microblades tangentially relative to said plurality of stator microblades in order to facilitate a momentum transfer to gas molecules in a radial direction, thereby enabling a high compression ratio and pump speed at a chip-scale level.

19. The apparatus of claim 18 further comprising a groove section formed between said concentric rings of blades associated with said rotor disk and said stator disk, wherein said groove section is dimensioned to receive and to retain at least one blade among said plurality of stator microblades.

* * * * *